(12) United States Patent
Andersen et al.

(10) Patent No.: US 8,186,375 B2
(45) Date of Patent: May 29, 2012

(54) RETAINER ASSEMBLY FOR SWIVEL SPOUT

(75) Inventors: Terrence J. Andersen, Sheboygan, WI (US); Craig J. Kohn, Sheboygan, WI (US); Meghamukta Ghosh, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 704 days.

(21) Appl. No.: 12/354,589

(22) Filed: Jan. 15, 2009

(65) Prior Publication Data

US 2010/0175765 A1   Jul. 15, 2010

(51) Int. Cl.
*E03C 1/04* (2006.01)
(52) U.S. Cl. ............... 137/359; 137/801; 285/139.2; 285/276; 285/280
(58) Field of Classification Search .......... 137/359, 137/801, 615; 4/675–678, 696; 285/139.1, 285/139.2, 276, 275, 280, 281, 278, 272
See application file for complete search history.

(56) References Cited

U.S. PATENT DOCUMENTS

| | | | |
|---|---|---|---|
| 2,468,315 A | 4/1949 | Wagner | |
| 4,478,438 A * | 10/1984 | Elorriaga, Jr. | 285/276 |
| 4,484,600 A | 11/1984 | Peterson et al. | |
| 4,592,388 A | 6/1986 | Wilcox | |
| 4,997,008 A | 3/1991 | Zbin | |
| 5,718,464 A * | 2/1998 | Mark | 285/321 |
| 5,758,690 A | 6/1998 | Humpert et al. | |
| 5,873,387 A | 2/1999 | Weber et al. | |
| 6,220,278 B1 | 4/2001 | Sauter et al. | |
| 6,381,770 B1 | 5/2002 | Raisch | |
| 6,530,606 B2 | 3/2003 | Lehner | |
| 7,055,545 B2 | 6/2006 | Mascari et al. | |

FOREIGN PATENT DOCUMENTS

| | | |
|---|---|---|
| EP | 143078 | 10/2001 |
| WO | WO 2008/136959 | 11/2008 |

OTHER PUBLICATIONS

Four pages of an International Search Report in PCT/US2010/020970 dated Apr. 29, 2010 in a corresponding application.

* cited by examiner

*Primary Examiner* — Craig Schneider
(74) *Attorney, Agent, or Firm* — Foley & Lardner LLP

(57) ABSTRACT

A swing spout assembly is disclosed which has a spout having a channel extending from an inlet end to a discharge end. A radially extending groove is formed adjacent the inlet end of the spout, and a snap ring is received in the groove of the spout. A pair of glides in the form of wear washers sandwich the portion of the snap ring extending out of the groove to form a bearing sub-assembly. An escutcheon is positioned around at least part of the inlet end of the spout. A stationary body has a portion that extends into the channel of the spout and a portion extending around an outer radial periphery of the inlet end of the spout. The portion extending around the outer periphery of the inlet end and the escutcheon defining a pocket that retains the bearing sub-assembly.

12 Claims, 4 Drawing Sheets

RETAINER ASSEMBLY FOR SWIVEL SPOUT

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to swivelable faucet spouts which deliver water or other fluids to selected basins. More particularly it relates to an assembly for attaching such spouts in an ornamentally desirable fashion without compromising the ability of the spout to swivel.

Many sinks have a spout that is capable of swiveling for the convenience of the user. For example, a swiveling spout can be swung to the side to allow for the insertion of large objects (e.g. a large pot) into the sink basin for cleaning. Swiveling spouts are also frequently used with sinks having multiple or segmented basins, as a swiveling spout allows the user to direct water from the spout into each of the basins as desired.

Various considerations need to be made in the construction of such a swiveling spout. For example, the spout should smoothly swivel from side to side without unpleasant sounds or uneven resistance to movement. On the other hand, the spout must be restrained from separating from the faucet structure even when subjected to water pressure during use.

Many conventional methods of retaining a swiveling spout compromise the aesthetics of the spout. In some assemblies, the swiveling spout includes visible screws threaded through the spout that are used to retain the spout to some aspect of the fixed plumbing.

In other assemblies (see e.g. U.S. Pat. Nos. 4,997,008 and 5,873,387), a large retaining nut is used to secure the spout to the fixed plumbing or some other fixed body such an escutcheon. This places substantial ornamental constraints on the appearance of the design.

In U.S. Pat. No. 2,468,315 it was proposed to use a split spring ring mounted on a swivelable spout to connect a swivel spout to a faucet body with a snap connection. However, the ring over time would wear against the valve body material creating undesirable swiveling resistance, and/or an undesirable sound when the spout swiveled.

Addressing such problems could raise complexities given that any solution preferably was something implementable on an automated production line, and/or needed to meet design criteria which needed reliability after installation for a decade or more, without creating still other problems such as leakage.

Accordingly, there still exists a need for improving the manner in which swivelable faucet spouts are mounted to valve bodies or water supplies.

SUMMARY OF THE INVENTION

In one aspect the invention provides a swing spout assembly that has a channel extending from an inlet end to a discharge end. A radially extending groove is formed adjacent the inlet end of the spout. A snap ring is received in the groove of the spout, albeit with a portion of the snap ring extending out from the groove. A pair of glides (preferably in the form of wear washers) sandwich the portion of the snap ring extending out from the groove, to thereby form a bearing sub-assembly.

The swing spout assembly further includes an escutcheon and a stationary body. The escutcheon is positioned around at least part of the inlet end of the spout. The stationary body has a portion that extends into the channel of the spout and a portion that extends around an outer radial periphery of the inlet end of the spout. The portion of stationary body extending around the outer periphery of the inlet end and the escutcheon define a pocket that retains the bearing sub-assembly on the spout.

The spout is swivelable relative to the escutcheon and the stationary body. Meanwhile, the snap ring helps restrict relative axial movement between the spout and the stationary body. Also, the swing spout assembly may include an o-ring forming a seal between the channel of the spout and the stationary body, and there may be one or more bearings placed between the stationary body and the spout. Further, the stationary body may include an annular recess formed on a radially outward facing surface of the portion of the stationary body that extends into the channel of the spout. The bearing may be received in the annular recess.

In one preferred form of the invention the stationary body has a passage running there through that is in communication with the channel of the spout, and also has a structure adapted to link to a hose adjacent one end of the passage of the stationary body. The escutcheon and the stationary body may be press-fit together, adhesively joined, or otherwise connectors.

In an especially preferred form the pair of glides are in the form of wear washers made of a polymeric material, and the snap ring is metallic. Such a snap ring may be brazed into the groove of the spout.

In another aspect the invention provides a method of assembling such a swing spout. The snap ring is placed into the groove of the spout. A set of wear washers is placed on each side of the snap ring to sandwich a portion of the snap ring, thereby forming a bearing sub-assembly.

An escutcheon is placed on a first side of the bearing sub-assembly. A stationary body is placed on a side of the bearing assembly opposite the first side of the bearing sub-assembly. The stationary body and the escutcheon thus form a pocket that houses the bearing sub-assembly.

Thus, swing spout assemblies of the present invention provide a means of linking the spout to a faucet body or the like while hiding the means of connection. Hence, no unsightly screws or very large tall visible retaining nuts are required.

The metallic snap ring provides reliable operation over extended life periods, yet the glides (preferably plastic wear washers) avoid metal on metal contact during the swiveling, avoiding undesirable sounds and undesirable resistance to swiveling. Further, the means of trapping and retaining the bearing sub-assembly is one suitable for implementing via automated assembly equipment.

The foregoing and other advantages of the present invention will become apparent from the following description. In that description reference will be made to the accompanying drawings which form a part thereof, and in which there is shown by way of illustration an example embodiment of the invention. However, the example embodiment is not intended as a representation of the full scope of the invention. Rather, the claims should be looked to for that purpose.

DETAILED DESCRIPTION OF THE INVENTION

Figure 1:
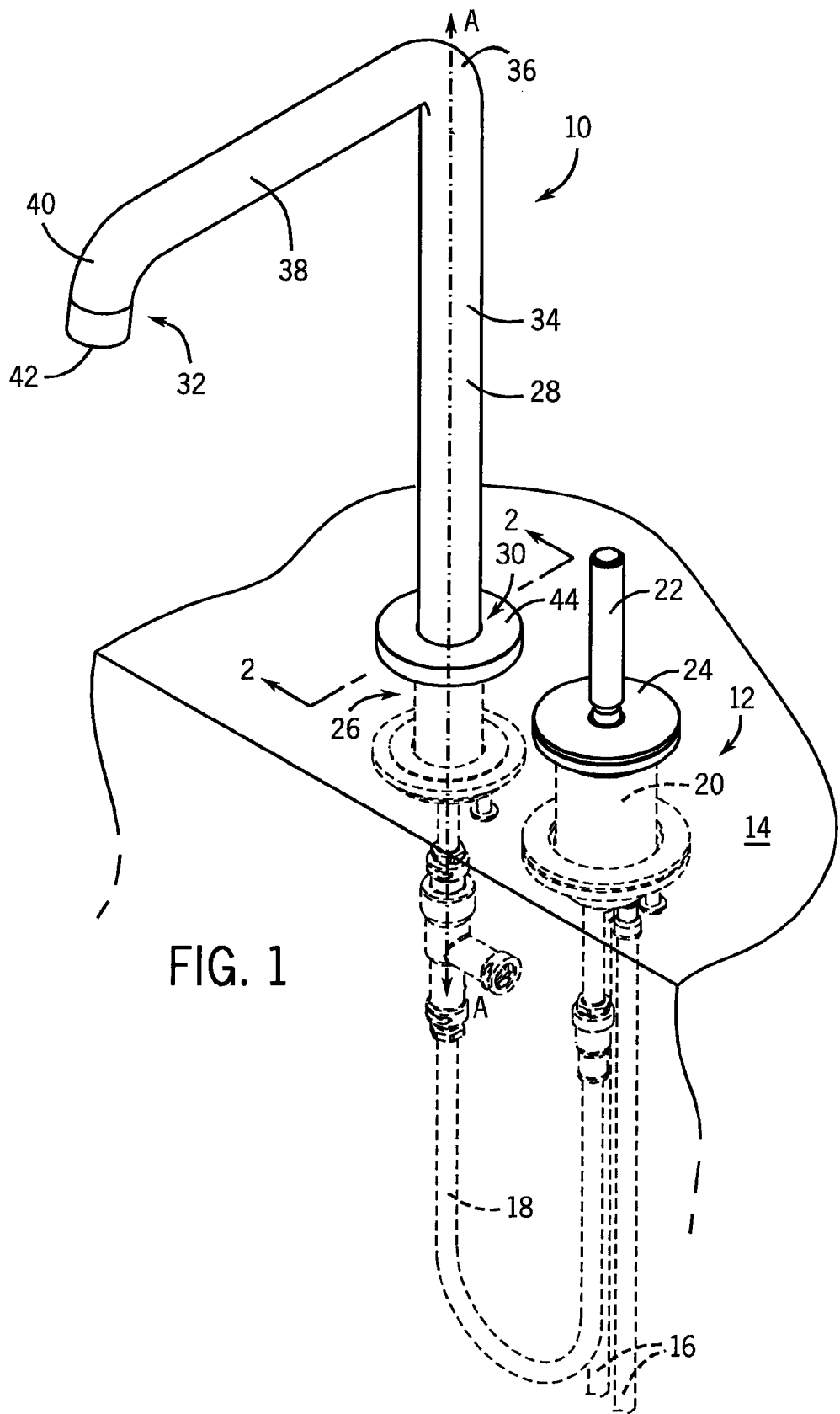
FIG. 1 is a right, upper, frontal perspective view of a swing spout assembly of the present invention mounted on a supporting surface, as well as an example control handle assembly which can be used therewith.
Figure 2:
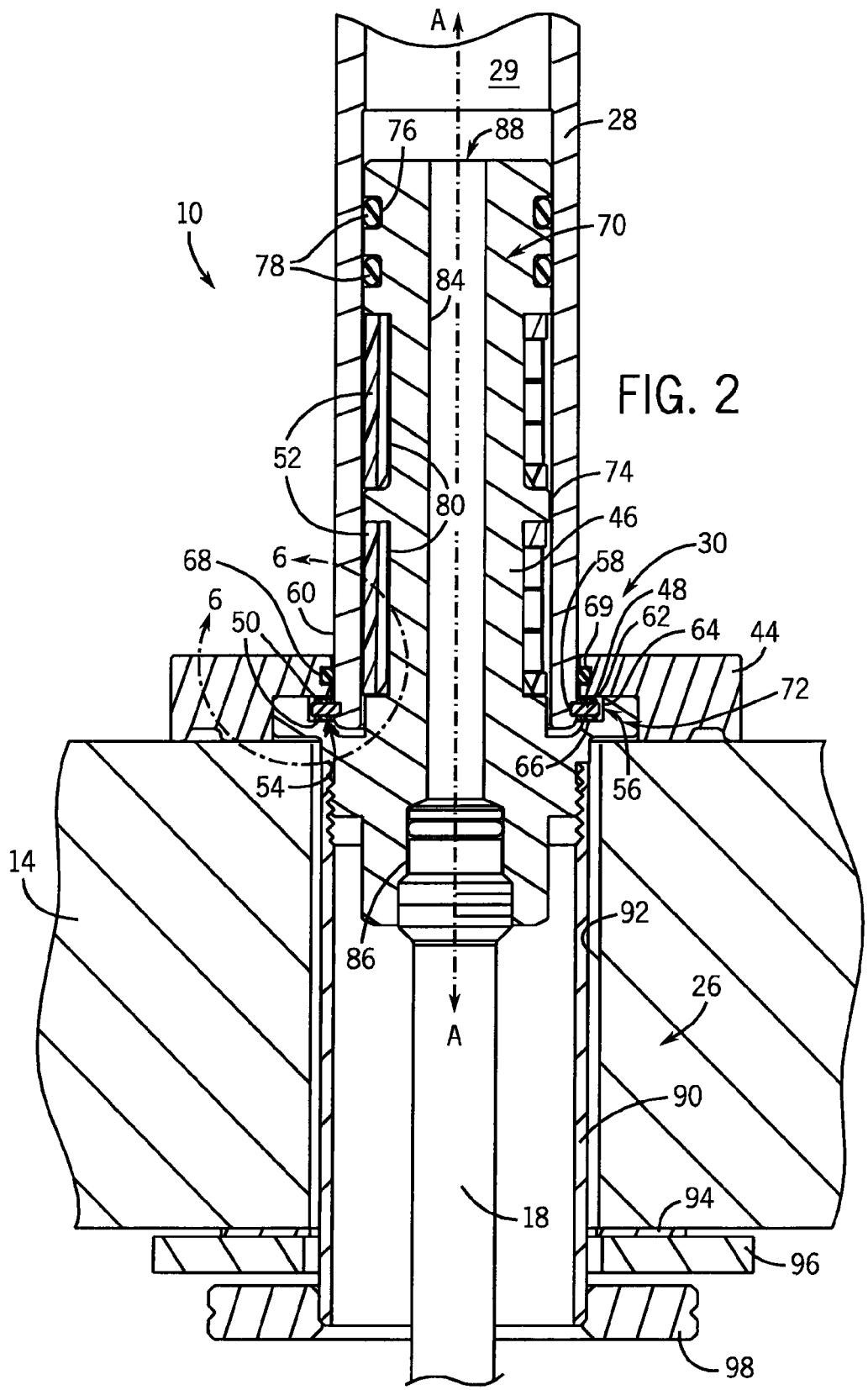
FIG. 2 is a cross-sectional view taken along a line 2-2 of FIG. 1.

Referring first to FIGS. 1 and 2, a swing spout assembly generally 10 and a lever handle assembly generally 12 are shown as installed through a support surface 14. The surface could be a counter top adjacent a basin, or alternatively part of a sink. As is well understood in the art, hot and cold water supply conduits 16 can be linked to run into the lever handle assembly 12, and a mixed water conduit 18 can be linked to run from the lever handle assembly 12 to a spout. In this case we show it as linked to swing spout assembly 10.

The lever handle assembly 12 includes a valve housing 20 mounted through the support surface 14, a joystick type lever handle 22, and a handle escutcheon 24 surrounding the lever handle 22 near the support surface 14. The valve housing 20 contains a mixing valve (not shown) that mixes the hot and cold water supplied by the hot and cold water supply conduits 16 based on the user positioning of the lever handle 22. The mixed water then flows from the lever handle assembly 12 to the swing spout assembly 10 via the mixed water conduit 18.

Although a joystick type lever handle assembly 12 is shown, various other water mixing or regulating means could also be employed. For example, the lever handle assembly 12 could be replaced by separate hot and cold water handles with separate flow regulation valves. The hot and cold water output from each of the valves could then be mixed downstream.

Moreover, in some forms, a single handle could control a single flow regulation valve that does not include mixing that is supplied to the swing spout assembly 10. A person having skill in the art will recognize that many other types of handles, valves, and/or mixing mechanisms could also be used to control the flow of water to the swing spout assembly 10.

In any event, the swing spout assembly 10 includes a fixed housing 26 mounted through the support surface 14 and a spout 28 swivelably connected to the fixed housing 26 at an inlet end 30. The spout 28 has a channel 29 extending from the inlet end 30 to a discharge end 32. As the spout 28 extends from the inlet end 30 to the discharge end 32, the spout 28 includes an essentially vertical segment 34 connected at a bend 36 to an essentially horizontal segment 38 which is connected to another bend 40 that has a downward-facing outlet 42 formed thereon. Of course, the spout could instead be curved or otherwise configured instead.

When the water is supplied to the swing spout assembly 10 via the mixed water conduit 18 the water flows through a portion of the fixed housing 26 (shown in better detail in FIG. 2) and spout 28 to the outlet 42. As the spout 28 is swivelable with respect to the housing 26 about an axis of rotation A-A, the outlet 42 of the spout 28 can be moved to direct the stream of water flowing from the outlet 42 or to clear the spout 28 of an area above a basin or the like.

Figure 3:
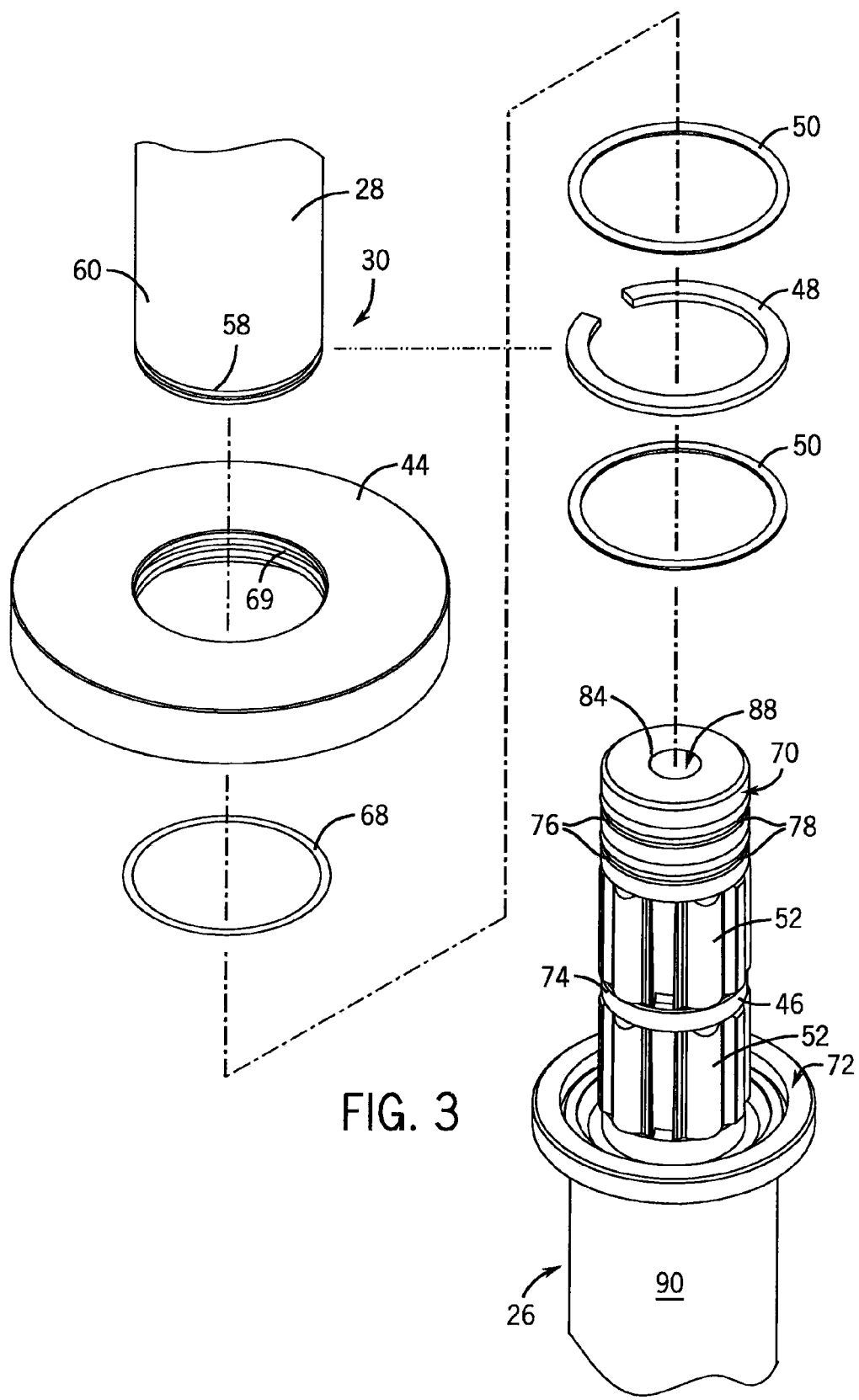
FIG. 3 is an enlarged exploded perspective view of certain components and portions of the FIG. 1 swing spout assembly.

The particular structure that allows this swiveling action, while securely affixing the spout to the fixed housing 26, will now be described in detail. Referring to FIGS. 2 and 3, the various elements of the swing spout assembly 10 that allow the rotation of the spout 28 are shown. In addition to the spout 28, the swing spout assembly 10 includes an escutcheon 44, a stationary body 46, a snap ring 48, a pair of glides in the form of plastic wear washers 50, a set of bearings 52, and various o-rings.

Conceptually, the swing spout assembly 10 contains three main portions. The first portion is the spout 28 that includes a bearing sub-assembly 54 positioned on the inlet end 30. The bearing sub-assembly 54 of the first portion is captured in a pocket 56 formed by the assembly of the second and third portions around bearing sub-assembly 54. In the form shown, the second and third portions include the escutcheon 44 and the stationary body 46. The escutcheon 44 and the stationary body 46 are mounted to the support surface 14 as part of the fixed housing 26 and the spout 28 is swivelable relative to it.

The spout 28 has a radially (preferably outwardly) extending groove 58 formed adjacent the inlet end 30, which receives the snap ring 48. As best seen in FIG. 3, the snap ring 48 can be a flat essentially annular body having a segment removed there from such that the snap ring 48 can be elastically deformed during insertion of the snap ring 48 in the radially extending groove 58. Hence, the term "ring" is being used in a manner so as not to necessarily require a fully surrounding structure. Of course, once inserted in the radially extending groove 58, a portion of the snap ring 48 still extends out past a radially outward facing surface 60 of the spout 28.

Although the snap ring 48 could be made of a number of materials, it is preferably composed of a steel or other metallic material. In some forms, the snap ring 48 is brazed into the radially extending groove 58 to permanently join the spout 28 and the snap ring 48.

The pair of wear washers 50 are placed on either side of the snap ring 48 (i.e., above and below the snap ring 48) to cover at least a part of the portion of the snap ring 48 that extends out past the radially outward facing surface 60 of the spout 28. Each of the wear washers 50 is preferably ring-like in shape, and when placed on either side of the snap ring 48, the pair of wear washers 50 sandwich the snap ring 48. Most preferably the pair of wear washers 50 is formed of a plastic or polymeric material having a low coefficient of friction.

Figure 6:
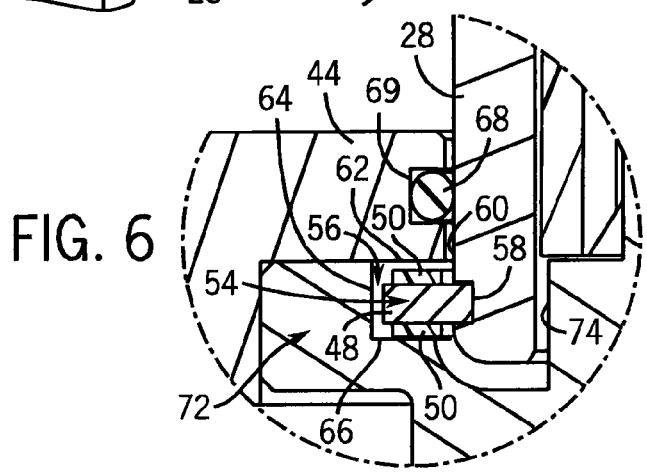
FIG. 6 is a detailed portion of the FIG. 2 cross-sectional view, as indicated by line 6-6 of FIG. 2.

The combination of the snap ring 48 and the pair of wear washers 50 creates the bearing sub-assembly 54 adjacent the inlet end 30 of the spout 28. As best seen in FIG. 6, the bearing sub-assembly 54 is retained in the pocket 56 which is formed by a downward axially facing wall 62 of the escutcheon 44 along with a radially inward facing wall 64 and an upward axially facing wall 66 of the stationary body 46 about the inlet end 30 of the spout 28. The upward and downward designations refer to the positions of the walls in the typical installed orientation of the swing spout assembly 10. Of course, if the spout is mounted on a vertical wall the appropriate terms would be inward and outward.

In any event, it should be appreciated that the walls forming the pocket 56 could be differently located on the escutcheon 44 and the stationary body 46 (i.e., the stationary body 46 could provide one of the axially facing walls defining the pocket 56, while the escutcheon 44 provides the other axially facing wall and the radially inward facing wall).

As will be appreciated from FIG. 2, the escutcheon 44 is positioned around the inlet end 30 of the spout 28 and abuts the support surface 14. An o-ring 68 is placed in a radial groove 69 in the escutcheon to form a seal between the spout 28 and the escutcheon 44. This seal is formed proximate the location of the bearing sub-assembly 54 along the radially outward facing surface 60 of the spout 28 in the direction of the discharge end 32.

The stationary body 46 includes an insertable portion 70 that extends into the channel 29 of the spout 28 and a flanged portion 72 that extends around an outer radial periphery of the inlet end 30 of the spout 28. The flanged portion 72 is the portion that extends around the outer periphery of the inlet end 30 to help define the pocket 56 as described above. The insertable portion 70 is generally cylindrically shaped and has a radially outward facing surface 74. In the radially outward facing surface 74, a pair of annular recesses 76 is formed for receiving a corresponding pair of o-rings 78 that form a seal between the radially outward facing surface 74 and the inner walls of the channel 29. Also, a pair of annular recesses 80 is formed in the radially outward facing surface 74 of the stationary body 46 that receive the pair of bearings 52. The pair of bearings 52 contact the inner wall of the channel 29 and help to maintain proper alignment of the stationary body 46 with respect to the spout 28 and help to provide a smooth swiveling action when the spout 28 is moved.

Among other things, the pair of bearings 52 helps to ensure that the bearing sub-assembly 54 contacts one of the axially facing walls 62 and 66 of the pocket 56 rather than the radially inward facing wall 64 by aligning the stationary body 46 and the spout 28 (which has the bearing sub-assembly 54 attached). As the pair of wear washers 50 sandwich the axial faces of the snap ring 48, but not protect the outer circumference, this helps to ensure that the snap ring 48 does not directly contact the walls of the pocket 56, but that the pair of wear washers 50 do. In the case where the snap ring 48, the escutcheon 44, and the stationary body 46 are metal and the pair of wear washers 50 is plastic, this helps to prevent metal-on-metal contact as the result of the spout 28 tipping off of the axis of rotation A-A.

The stationary body 46 also includes a passage 84 that runs axially through the stationary body 46 from a hose connector 86 near the flanged portion 72 that receives the mixed water conduit 18 to an open end 88 on the insertable portion 70 of the spout 28. The passage 84 places the mixed water conduit 18 in communication with the channel 29 in the spout 28 and, ultimately, the outlet 42.

For mounting purposes a tubular body 90 is threaded to the stationary body 46. The tubular body 90 extends through a through hole 92 of the support surface 14. Various spacers, rings, and the like 94, 96, and 98 are attached to the other end of the tubular body 90 and are used to clamp or otherwise fix the swing spout assembly 10 to the support surface 14.

Figure 4:
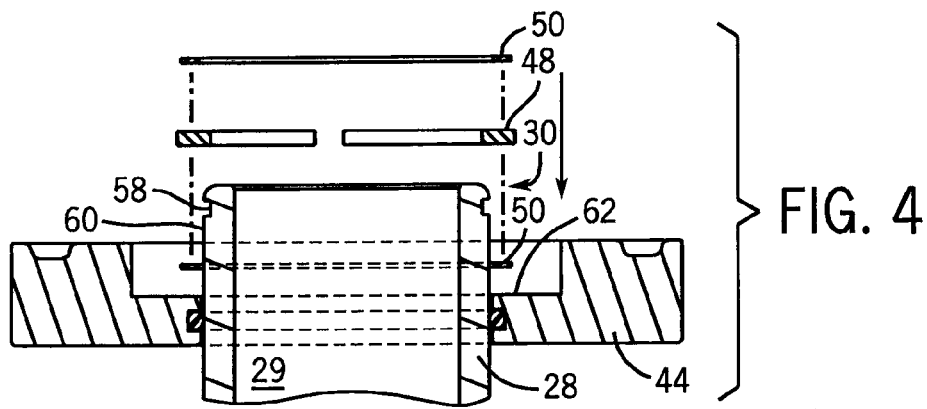
FIG. 4 is a detailed cross-sectional view of certain spout assembly components, shown during assembly, albeit shown in an inverted configuration.
Figure 5:
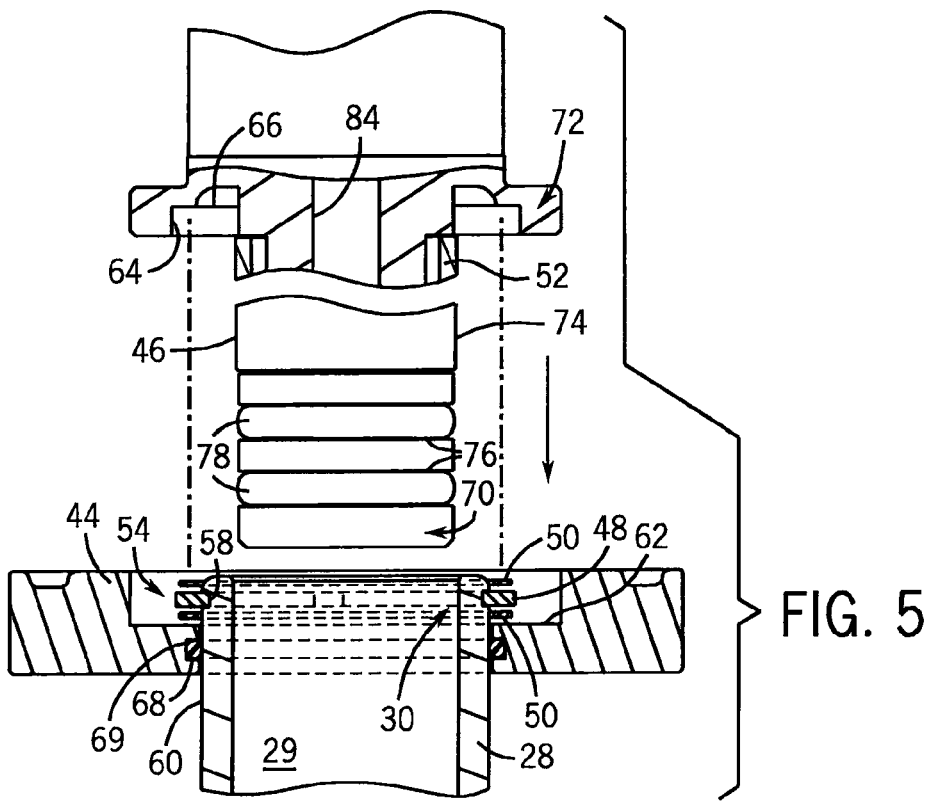
FIG. 5 is another detailed cross-sectional view, somewhat similar to FIG. 4 in nature, but shown in a further stage of assembly.

Referring now to FIGS. 4 and 5, example steps of assembly of the spout construction are depicted. It has been found particularly advantageous to assemble the parts upside-down.

The snap ring 48 is first placed in the radially extending groove 58 of the spout 28. Next, the one of the wear washers 50 is placed on each side of the snap ring 48 so as to sandwich at least a portion of the snap ring 48 to form the bearing sub-assembly 54. The escutcheon 44 is then slid along the spout 28 until it is next to one side of the bearing sub-assembly 54.

The stationary body 46 is then placed on the other side of the bearing sub-assembly 54 to form the pocket 56. More specifically, the insertable portion 70 of the stationary body 46 is inserted into the channel 29 of the spout 28 and the flanged portion 72 is positioned around the bearing sub-assembly 54 to form the rest of the pocket 56 as the flanged portion 72 enters a recess in the escutcheon 44.

It is contemplated that the o-ring 68 provides enough friction to keep the escutcheon positioned relative to the spout 28 after installation. Hence, this is a form of press-fit connection of those parts. However, if desired, an adhesive can also be used to fix the position. It will also be appreciated that o-rings 78 frictionally help retain the spout along the structure 70.

Thus, the assemblies of the present invention achieve a variety of important advantages. They are inexpensive to produce, permit aesthetically pleasing constructions, are reliable over the long term, are noise resistant, and permit careful control over swiveling resistance. Of course, what has been described thus far is merely a preferred embodiment of the invention. It should be appreciated that various other modifications could be made without departing from the spirit and scope of the invention. Thus, the claims should be looked to in order to judge the full scope of the invention.

INDUSTRIAL APPLICABILITY

The present invention provides swivelable spout assemblies linked to their water supply in an aesthetically pleasing and reliable manner.

We claim:

1. A method of assembling a swing spout assembly, comprising:
   placing a snap ring in a groove of a spout;
   placing a set of wear washers on opposite sides of the snap ring to sandwich a portion of the snap ring and thereby form a bearing sub-assembly;
   placing an escutcheon on a first side of the bearing sub-assembly; and
   placing a stationary body on a side of the bearing assembly opposite the first side of the bearing sub-assembly, the stationary body and the escutcheon forming a pocket that houses the bearing sub-assembly, the stationary body having a portion that extends into the spout.

2. The method of claim 1, wherein the snap ring is metallic and wherein the method further comprises the step of brazing the snap ring to the spout.

3. A swing spout assembly, comprising;
   a spout having a channel extending from an inlet end to a discharge end;
   a radially extending groove formed adjacent the inlet end of the spout;
   a snap ring received in the groove of the spout, albeit having a portion thereof extending out from the groove;
   a pair of glides sandwiching said extending out portion of the snap ring to form a bearing sub-assembly;
   an escutcheon positioned around at least part of the inlet end of the spout; and
   a stationary body having a portion that extends into the channel of the spout and a portion extending around an outer radial periphery of the inlet end of the spout, the portion extending around the outer periphery of the inlet end and the escutcheon defining a pocket that retains the bearing sub-assembly;
   wherein the spout is swivelable relative to the escutcheon and the stationary body, and the snap ring helps restrict relative axial movement between the spout and the stationary body.

4. The swing spout assembly of claim 3, further comprising an o-ring forming a seal between the channel of the spout and the stationary body.

5. The swing spout assembly of claim 3, wherein the escutcheon and the stationary body are press-fit together.

6. The swing spout assembly of claim 3, wherein the escutcheon and the stationary body are adhesively joined.

7. The swing spout assembly of claim 3, wherein the glides are in the form of a pair of wear washers made of a polymeric material, and the snap ring is metallic.

8. The swing spout assembly of claim 3, wherein the snap ring is brazed into the groove of the spout.

9. The swing spout assembly of claim 3, further comprising a bearing placed between the stationary body and the spout.

10. The swing spout assembly of claim 9, wherein the stationary body includes an annular recess formed on a radially outward facing surface of the portion of the stationary body that extends into the channel of the spout and wherein the bearing is received in the annular recess.

11. The swing spout assembly of claim 3, wherein the stationary body has a passage running there through that is in communication with the channel of the spout.

12. The swing spout assembly of claim 11, wherein the stationary body further includes a structure adapted to link to a hose adjacent one end of the passage of the stationary body.

* * * * *